United States Patent
Zimmerman

[15] 3,660,906
[45] May 9, 1972

[54] THREE-AXIS INSPECTION PROBE

[72] Inventor: Harry M Zimmerman, Roseville, Calif.

[73] Assignee: Aerojet-General Corporation, El Monte, Calif.

[22] Filed: Mar. 17, 1969

[21] Appl. No.: 818,852

Related U.S. Application Data

[63] Continuation of Ser. No. 680,841, Nov. 6, 1967, abandoned.

[52] U.S. Cl. .......................................... 33/174 L
[51] Int. Cl. .......................................... G01b 7/28
[58] Field of Search ........................ 33/169, 172, 174

[56] References Cited

UNITED STATES PATENTS

| | | | |
|---|---|---|---|
| 1,141,396 | 6/1915 | Jubinville | 33/169 C |
| 2,090,178 | 8/1937 | Brickner | 200/61.42 |
| 2,090,495 | 8/1937 | Witchger | 33/172 |
| 2,231,805 | 2/1941 | Freitas | 33/172 B |
| 2,321,443 | 6/1943 | Windfeldt | 33/172 |
| 2,437,190 | 3/1948 | Gale | 33/169 |
| 2,439,565 | 4/1948 | Egor | 33/172 B |
| 2,576,590 | 11/1951 | Gentzhorn | 33/172 E |
| 2,911,727 | 11/1959 | Steinhart | 33/169 C |
| 3,121,370 | 2/1964 | Larsen | 90/62 |
| 3,250,012 | 5/1966 | Hilton et al | 33/172 E |

FOREIGN PATENTS OR APPLICATIONS

| | | | |
|---|---|---|---|
| 1,184,972 | 1/1965 | Germany | 33/172 B |

*Primary Examiner*—Harry N. Haroian
*Attorney*—Edward O. Ansell, D. Gordon Angus and Taylor M. Belt

[57] ABSTRACT

An inspection probe capable of accurate output in three axes, having a spherical probe tip affixed to an arm. Medially disposed about the arm between the end of the spherical tip and the opposite end of the arm is a pivot ball permitting the arm to pivot at its midpoint within a housing provided. The arm passes through the spherical ball permitting additionally linear movement relative to the pivot ball. Adjoining the end of the pivot arm is a transfer pin restricted to solely linear motion. The end of the probe arm and the adjacent surface of the transfer pin are provided with adjoining sliding surfaces so that all movement of the probe tip is thus transferred into linear movement of the transfer pin in a ratio of 1:1. The transfer pin in turn effects a suitable gauge for reading the movement of the probe tip.

6 Claims, 6 Drawing Figures

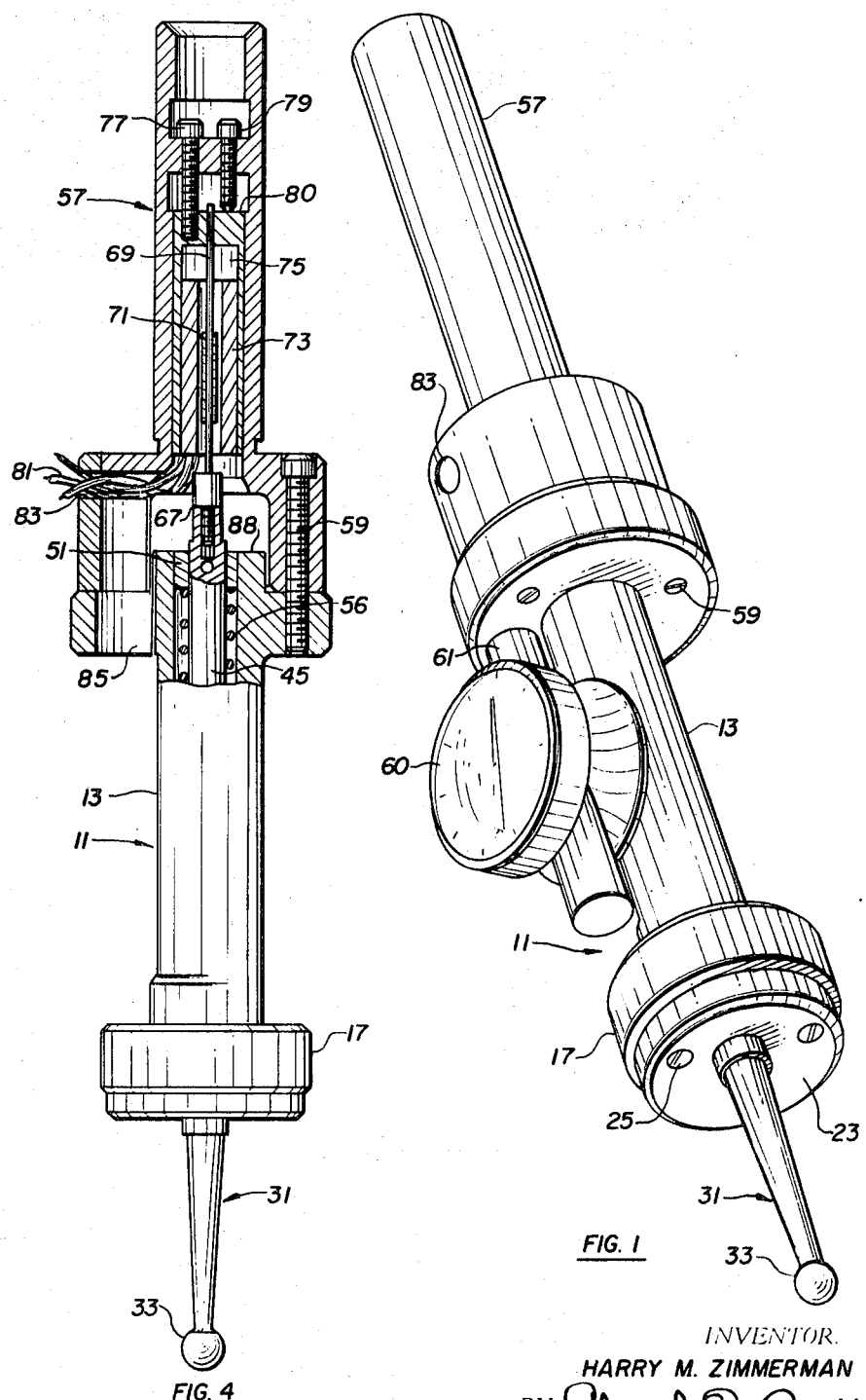

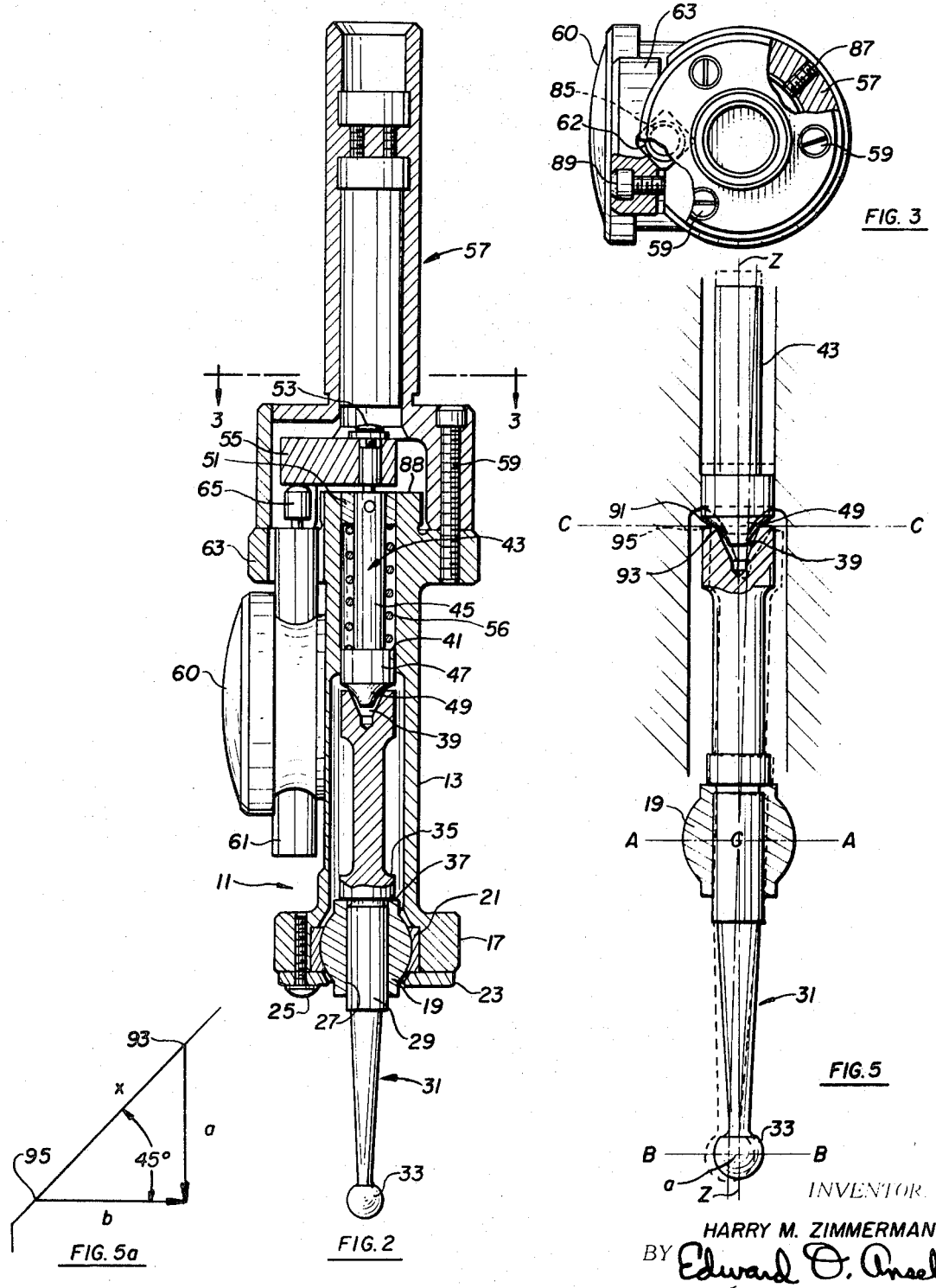

THREE-AXIS INSPECTION PROBE

This is a continuation of 680,841 filed 11-6-67, now abandoned.

Prior to the herein invention, many devices have existed to obtain a reading of the variation in the surface of a work piece. Some of these devices were even able to obtain measurements along three axes, that is, an axis parallel to the axis of the device itself, and the two axes normal thereto. It is generally desirable in such measuring devices to be able to continually obtain measurements in planes that pass through the various axes on a continuous basis. Most of the prior art devices, however, are unable to continuously or simultaneously obtain measurements passing from one plane or axis to another without changing settings and the like. Devices that do exist for obtaining continuous readings along all three axes require complicated cam arrangements to compensate for the movement according to the axis or plane in which the reading is being taken, are relatively complex in construction, and have various inherent limitations on the size of the overall device. Additionally, these prior art devices do not provide an output that is readily adaptable to either a mechanical gauge reading or, alternatively, electronic indication. Much of the complexity in the prior art devices which, like the one described herein, convert all angular motion into linear functions, is because they do not so convert the movement of the probe tip into linear motion in a 1:1 ratio so that the linear motion will always be an exact reflection of the distance traveled by the tip of the probe. Because of lacking a 1:1 conversion ratio, the prior art devices have of necessity become complex to compensate therefor.

Thus, it is an object of this invention to provide a three-axis probe measuring device which reflects in a linear motion the exact displacement of the probe tip through any axis or plane in which the tip moves.

A further object of this invention is to provide a three-axis probe measuring device which has a linear output and is simple in construction, alleviating the requirement for cam devices to provide such an output.

The above and other objects of this invention are accomplished by a device comprised of an elongated housing in which is partially disposed a probe arm with one half of the arm extending from the housing and having a spherical tip thereon for sensing the work piece. The probe arm slidably engages a rotating ball joint which is seated in the forward end of the housing. The arm extends through the ball joint to a point medially disposed within the housing. The end of the probe arm within the housing has an inwardly tapered conical configuration which is in contact with a conically shaped end of a transversely slidable pin which is spring loaded within the housing. The configuration of cone on the tip of the pin is approximately a 90 degree right angle cone, and as a result, any movement relative to the end of the probe arm relative to the pin's conical surface will result, as will be further explained, in a precise 1:1 linear motion of the pin to the movement of the probe tip. Alternatively, the end of the probe arm can be conically tapered toward a receptacle cone in the pin. The opposite end of the pin can be directly connected in one embodiment to a differential transformer so as to obtain an electronic output. Alternatively, the pin may be connected to a follower block which will move in accordance with the pin action. In turn, the block movement is sensed by a mechanical sensing device to give a readout on a dial that can be integral with the probe apparatus.

The operational environment for this invention is an inspection device which may be utilized to measure variations in the surface contour of a workpiece or to inspect linear measurements of products, for example, as an inspection tool in conjunction with a commercially available three-axis numerically controlled inspection machine. In addition, this invention may be used to set up work pieces in various machines, for example, to properly position work pieces in boring machines, lathes, shapers, planers, or milling machines. When using this invention, surfaces may be probed along any axis without resetting the device as is commonly required with existing probe devices.

It is believed the invention will be better understood from the following detailed description and drawings in which:

FIG. 1 is an overall pictorial perspective representation of the probe device of this invention.

FIG. 2 is a partially sectioned view of the probe of FIG. 1.

FIG. 3 is a partially sectioned end view taken along lines 3—3 of FIG. 2.

FIG. 4 is a partially sectioned pictorial view of an embodiment of the invention utilizing an electronic output through a differential transformer.

FIG. 5 shows the relationship of the probe arm to the pin displaying the importance of the conical shape.

FIG. 5a is an enlarged view of the relationship of the adjoining surfaces of the probe arm and transfer pin.

Turning now to FIGS. 1 and 2 which show an embodiment that displays an output readable on an attached dial indicator, there is seen the probe device 11 having a cylindrically shaped housing 13. The housing 13 has an outward flanged front end 17. Within the flanged portion is seated a rotating ball 19 which is surrounded by a suitable bearing material 21 of Teflon or other suitable material. A cover plate 23 secured by screws 25 holds the bearing 21 in place within the flange 17, thus securing the ball 19. The ball 19 is provided with a center aperture 27 through which passes in sliding engagement a corresponding cylindrical portion 29 of the probe arm 31 of the device 11. The forward end of the probe arm has appropriately affixed thereto a spherical tip 33. The probe arm additionally is provided with an outwardly extending flange portion 35 to the rear of the ball 19 which mates with a flat ridge surface 37 formed on the ball. The rear of the probe arm 31 has an inwardly formed conical portion 39 which has a cone of, for example, 60 degrees.

Slidably mounted in the rear portion of housing 13 within a cylindrically formed aperture 41 is transfer pin 43 which serves to transfer any motion of the probe arm 31 into linear motion. The transfer pin 43 has a main elongated body 45 with an enlarged head portion 47 which is in sliding engagement with aperture 41. The front of the head portion 47 is formed into a cone 49 of approximately 90 degrees and engages the inwardly formed conical portion 39 on the end of the probe arm 31 in a manner which will be described hereinafter in more detail with reference to FIG. 5. In the region where the pin 43 passes through the rear of the housing 13, it is surrounded by a bushing 51 of suitable material, such as plastic for example, which serves to maintain its centering within the aperture 41 as well as to facilitate sliding motion therethrough. Secured to pin 43 by screw 53 is a follower block 55 which extends upwardly and outwardly from the end of housing 13. A light spring 56 extends between the bushing 51 and head portion 47 of the pin within the aperture 41 so as to maintain contact between the pin and the probe arm 31.

An additional elongated cylindrical housing 57 is affixed to the main housing 13 by bolts 59 and extends rearwardly for the purpose of enclosing electrical components not utilized in this embodiment. Additionally, housing 57 can serve as a support where the probe can be held by appropriate machinery. Mounted on top of the main body 13 of the device is a dial indicator 60 having a mounting shaft 61 which extends through a rear flange portion 63 of the main body 13. A feeler arm 65 contacts the follower block 55 such that any movement of the follower block is reflected on the indicator 60. The dial indicator 60 is a conventional device well known in the art which can, for example, be a dial indicator as described in Sec. 3.12 of Commercial Standard CS8-51, Gage Blanks, Fourth Edition, effective Apr. 15, 1951.

Turning now to FIG. 4 there is shown a modification of the device wherein an electrical output can be obtained for use with either digital or analog equipment. The construction of the probe 11 is essentially the same except that the follower block 55 as seen in FIG. 2 is no longer utilized. In its place there is secured to the transfer pin 43 at the threaded end 67 a non-magnetic transfer core shaft 69 which extends rearwardly therefrom into the housing 57. Mounted on the core shaft is a magnetic core 71. Surrounding core 71 is a wound magnetic core 73. A bushing 75 surrounds the wound core 73 holding in tight sliding engagement the transformer core shaft 69 at the rear thereof. A first adjustable screw 77 holds the bushing 75 in position relative to the housing 57, while a second adjustable screw 79 acts as a set screw resting on the rear surface 80 of the bushing 75. By adjustment of the screws 77 and 79, the bushing 75 together with the tight fitted transformer wound magnet 73 can be moved laterally relative to the core 71 so as to obtain any necessary adjustments. The leads 81 from the wound magnet 73 leave the device through an aperture 83 for connection to a power source and suitable readout equipment. The readout equipment may be, for example, a voltmeter, a recorder or a digital display device, each of which is well known to those versed in the art. A filler block 85 occupies the aperture 62 through which the dial indicator 60 was formerly connected to the follower. The aforegoing provides a differential transformer where linear movement of the core 71 within the wound magnet 73 provides a proportional change in the output in leads 81.

Turning now particularly to FIG. 3, which is a partially sectioned rear view of the device in FIG. 2, there is seen an adjustable set screw 87 which passes through rear housing 57 to engage the rearward portion 88 of the main housing 13 for the probe device 11, as seen in FIG. 2. The use of this set screw 87 is particularly advantageous in the embodiment shown in FIG. 4 in which a differential transformer is used. Adjustment of this set screw 87 serves to slightly move the main housing 13, as seen in FIG. 4, relative to the rear housing 57 and is thus used to achieve a centering of the rear housing 57 with the spherical tip 33. When the gauge 60, shown in FIG. 2 and FIG. 4, is utilized instead of electronic output, the mounting shaft 61 is held in tight engagement with the rectangularly formed aperture 62 by means of a set screw 89 which passes through portion 63 acting as a clamp about the shaft 61.

Turning now to FIGS. 5 and 5a for an explanation of the operation of the device, it is seen that the probe arm 31 moves about a pivot point C on axis A—A through the center of ball 19. The Figure shows the probe arm 31 and associated transfer pin 43 in solid line outline in the original null position wherein all movement is along the Z—Z axis of the device. Alternatively, when the spherical tip 33 is displaced laterally, the rear conical receptacle 39 of the probe arm 31 is tilted laterally opposite and is shown in dotted outline form. In the configuration shown in FIG. 5, the distance from the center of the spherical tip 33 along the axis B—B to the axis A—A through the center of the ball joint is equivalent to the distance of the probe arm from the axis A—A to the rear end 91 along the C—C axis of the probe arm, which contacts the conical surface 49 of transfer pin 43. Thus, any displacement from the Z—Z axis along the B—B axis is equivalent to a similar displacement in the opposite direction of the end 91 of the probe arm 31 relative to the transfer pin 43. In other words, a relative movement of a ratio of 1:1 is provided about the A—A axis or pivot point C when the spherical tip 33 is displaced.

In the initial null position of the probe arm 33, the rear end 91 thereof contacts the conical surface 49 of the transfer pin 43 at the point 93. After the arm has tilted, the contact point moves down the surface of the cone toward the front of the transfer pin 43 to a new point 95, while the transfer pin 43 has moved rearwardly. In this embodiment the incline of the conical surface 49 is a half angle of 90°, or 45°. As seen in FIG. 5a, where an enlarged view of the surface and points 93 and 95 are shown, it can be seen that the vertical displacement along $x$, $a$, will equal the linear displacement, $b$. Since the tangent of 45° is 1, $a = b$. It can be seen that, $a$, is equivalent to the distance moved by the center of the spherical probe pin 33 from its initial starting position as seen in FIG. 5. Thus, since a 90° cone is chosen and the moment arms are equal about the axis A—A, all vertical displacement of the probe pin is transferred into an equal linear displacement of the transfer pin 43. The same theory can be applied to situations where the distance between axis A—A and axis B—B is not equal to the distance between axis A—A and axis C—C. For example, if the portion of the exposed probe arm, B—B to A—A, was twice as long as the distance internally of the housing, namely from A—A to C—C, then the angle of the incline of the surface of the cone would be chosen to produce a tangent of ½. This is because the vertical displacement along the C—C axis would be ½ the movement of the tip along the B—B axis, thus requiring a linear displacement along the Z—Z axis of twice that movement along the C—C axis. Thus, for example, the angle to produce such a tangent of ½ would be 26°34''.

From the foregoing, it can be seen that any length of probe arm can be chosen with a suitable conical angle corresponding to the relative length of the probe arm on either side of the A—A axis to achieve a 1:1 linear motion. The importance of the 1:1 motion is that all movement of the probe arm 31 is normally directly along the Z—Z axis when surfaces are encountered by the probe tip of less than a 45° angle. Once the angle of the surface increases to more than the 45°, the probe tip then is displaced relative to the Z—Z axis as shown in FIG. 5, causing the corresponding movement at the rear along the C—C axis, as explained. Thus, a transition exists in measuring any surface wherein movement effectively along the Z—Z axis is transferred into the displacement mentioned. Since the ratio of movement is always 1:1 along the Z—Z axis, one does not have to be concerned with the transition from such movement along that axis to the displacement of the tip from the axis, as long as the ratio remains at 1:1.

As can be appreciated from FIG. 5, it is to be noted that the movement of the probe arm 31 is about the axis A—A passing through the center of the ball 19. Thus, the end of the spherical tip 33 and the end 91 of the probe arm adjacent to conical surface both describe a slightly circular path corresponding to a radius about the center point C of the A—A axis. In other words, the displacement on the C—C axis is not truly linear but rather is slightly curved according to the radial movement indicated. Because of this slight curvature, compensation must be made in the face of the conical surface 49 of the transfer pin 43 in order to obtain the precisely accurate readings necessary for devices of this type.

To determine the slight curvature required on the surface of the cone 49, the following mathematical steps are taken: (1) A desirable range of probe movement is determined; (2) the linear distance from A—A to B—B between the center of the pivot point C and the center of the spherical tip 33 is chosen; (3) the linear distance between the center of the pivot point C and the end 91 along the Z—Z axis to the C—C axis of the probe arm 31 is chosen; and (4) a desirable radial distance from the Z—Z axis to the point where the probe arm 31 contacts the cone surface 49 in a null position is established, which point has been designated as 93. This radial distance must equal or exceed the desirable range of probe movement. Knowing the distance from the probe tip 33 to the pivot point C, the distance from pivot point C to the probe arm rear end 91, and the radial offset, one can readily determine by mathematical calculations the location of contact point 93 in the null position when the device is resting entirely along the Z axis, and can also determine mathematically the location of the point 95 when the probe arm 31 is in full deflection. By further mathematical calculations, one can similarly determine one or more points intermediate the point 93 and the point 95 necessary to maintain a linear ratio of 1:1 between the probe tip 33 linear deflection and the slider arm 43 linear movement. Having established three or more points along the curve to maintain a 1:1 ratio, the curvature of the conical surface 49 may be mathematically established to compensate for the arcuate movement of the probe arm rear end 91. When the established curved surface is formed on a cone as the conical surface 49, it will correspond exactly to the arc described by the probe arm rear end 91 of the probe device 11, and particularly it will maintain the desired 1:1 ratio as the contact point 93 moves with displacement of the probe tip 33.

In reducing this invention to practice, it was known that the contact point 93 follows a circular path. Three points on the conical surface were chosen to maintain the 1:1 ratio of the probe tip 33 linear displacement to the sliding arm 43 linear movement. The three points chosen were (1) the starting reference point or contact point 93, (2) a point equivalent to terminal travel at full probe arm deflection, which point is designated 95, and (3) a point equivalent to midway between the contact point 93 and the full deflection point 95. Three points along the cone surface having been established, it permitted the determination of the radius and the location of the center of a circle passing through the three points. The conical surface 49 was then formed on the slider arm 43 as a segment of the calculated circle passing through the three predetermined points.

It is apparent that when the conical surface 49 is on the slider arm 43, the surface 49 will be slightly concave. It should be equally apparent, in view of the foregoing discussion, that the conical surface 49, rather than being formed on the transfer pin 43, can be formed just as successfully on the end of the probe arm 31. In that event, the compensation will effect a slightly convex surface to compensate for the radial movement.

I claim:

1. An inspection probe device comprising:
An elongated housing having a front end with an opening therein;
a ball having a diametral hole therethrough, said ball being pivotally mounted in said opening;
a probe arm having a probe tip thereon remote from said housing, said probe arm slidably mounted in said ball and capable of motion in three mutually perpendicular planes, said probe arm extending from said probe tip outside said housing, through said ball, and terminating within said housing;
a transfer pin slidably disposed in said housing contacting the terminating end of said probe arm to directly transform all displacement of said probe arm to linear movement of said transfer pin in a single plane, said end of said probe arm and the adjacent end of said transfer pin being provided with conical, contacting, adjoining, slidable surfaces to achieve a percise predetermined relationship of relative movement of said probe arm to the resulting linear movement of said transfer pin, one of said conical surfaces being a protruding conical surface and the other of said conical surfaces being a receptacle conical surface, said protruding conical surface having a greater apex angle than said receptacle conical surface;
and means connected to said transfer pin for acting in cooperation with suitable readout devices, wherein the contacting, adjoining slideable surfaces of said probe arm and said transfer pin include a conical surface formed on one member and a suitable receptacle formed in the other, said conical surface having an arcuate curvature thereon, said curvature being in the conical-axial plane of revolution of said conical surface and extending from the apex to the base of said conical surface, said conical surface and said curvature having a predetermined relationship with the lengths of said probe arm, one length extending outwardly from a pivot point within said ball to said probe tip and the other length extending inwardly from said pivot point to the point of contact of said contacting surfaces, to achieve a 1:1 ratio of movement of said arm to said pin.

2. The device of claim 1 wherein said pin is provided with a concavely arcuate, conical surface tapering toward said probe arm,
the contacting adjacent end of said probe arm being provided with a receptacle for receiving said conical surface of said pin.

3. The device of claim 1 wherein the end of said probe arm within said housing is provided with a convexly arcuate, conical surface tapering toward said transfer pin,
the adjacent end of said transfer pin being provided with a receptacle for receiving said conical surface of said probe arm.

4. An inspection probe device comprising:
an elongated housing,
a rotatable ball disposed in the forward end of said housing,
a probe arm extending outwardly from said housing through, and in sliding engagement with, said ball, said arm terminating in said housing,
a spherical member provided on the exposed end of said probe arm outside of said housing,
a transfer pin disposed in said housing adjacent the end of said probe arm, said pin limited solely to linear movement,
means for maintaining continuous contact between adjoining surfaces of said pin and said probe arm,
a conical-shaped surface formed on one of said adjoining surfaces, said conical-shaped surface having an arcuate curvature thereon, said curvature being in the conical-axial plane of revolution of said conical-shaped surface and extending from the apex to the base of said conical-shaped surface, said conical-shaped surface and said curvature having a predetermined relationship with the lengths of said probe arm, one length extending outwardly from a pivot point within said ball to said spherical member and the other length extending inwardly from said pivot point to the point of contact of said adjoining surfaces, to result in a 1:1 ratio of movement of said probe arm to said pin,
a receptacle formed in the other of said adjoining surfaces for receiving said conical-shaped surface,
and means connected to said pin for acting in cooperation with suitable readout devices.

5. An inspection probe device comprising:
a probe arm having a probe tip and means for mounting said probe arm to be universally pivotal in a fixed plane and to have linear motion with respect to said plane;
a transfer pin in operable association with said probe arm and means for mounting said transfer pin so as to be restrained to linear motion normal to said plane;
a pair of adjacent, contacting, conical surfaces in slidable touching relationship intermediate said probe arm and said transfer pin, wherein a protruding conical surface is received by a receptacle conical surface, said protruding conical surface having a greater apex angle than said receptacle conical surface, one of said conical surfaces being mounted on said probe arm and the other of said conical surfaces being mounted on said transfer pin to effect the transmittal of motion from said probe arm to said transfer pin in a precise predetermined relationship of relative motion for all displacement of said probe arm;
and means responsive to motion of said transfer pin for effecting readout, wherein said pair of adjacent contacting conical surfaces comprises a protruding cone forming one of said surfaces, said cone having a slightly arcuate configuration between the apex and base thereof, and a cone-shaped cavity forming the other of said surfaces, said cavity constituting a receptical for receiving said protruding cone whereby any displacement of said probe arm causes said surfaces to slide in relation to each other and transmits motion to said transfer pin.

6. The device of claim 5 wherein said protruding cone has an apex angle of about 90 degrees and said cone-shaped cavity has an apex angle of about 60 degrees.

* * * * *